Nov. 28, 1933.  S. W. CADY ET AL  1,936,749
TRACTOR CULTIVATOR
Filed Oct. 14, 1932  3 Sheets-Sheet 1

Inventors
Sherman W. Cady
Hiram P. Smith
By _____ Atty.

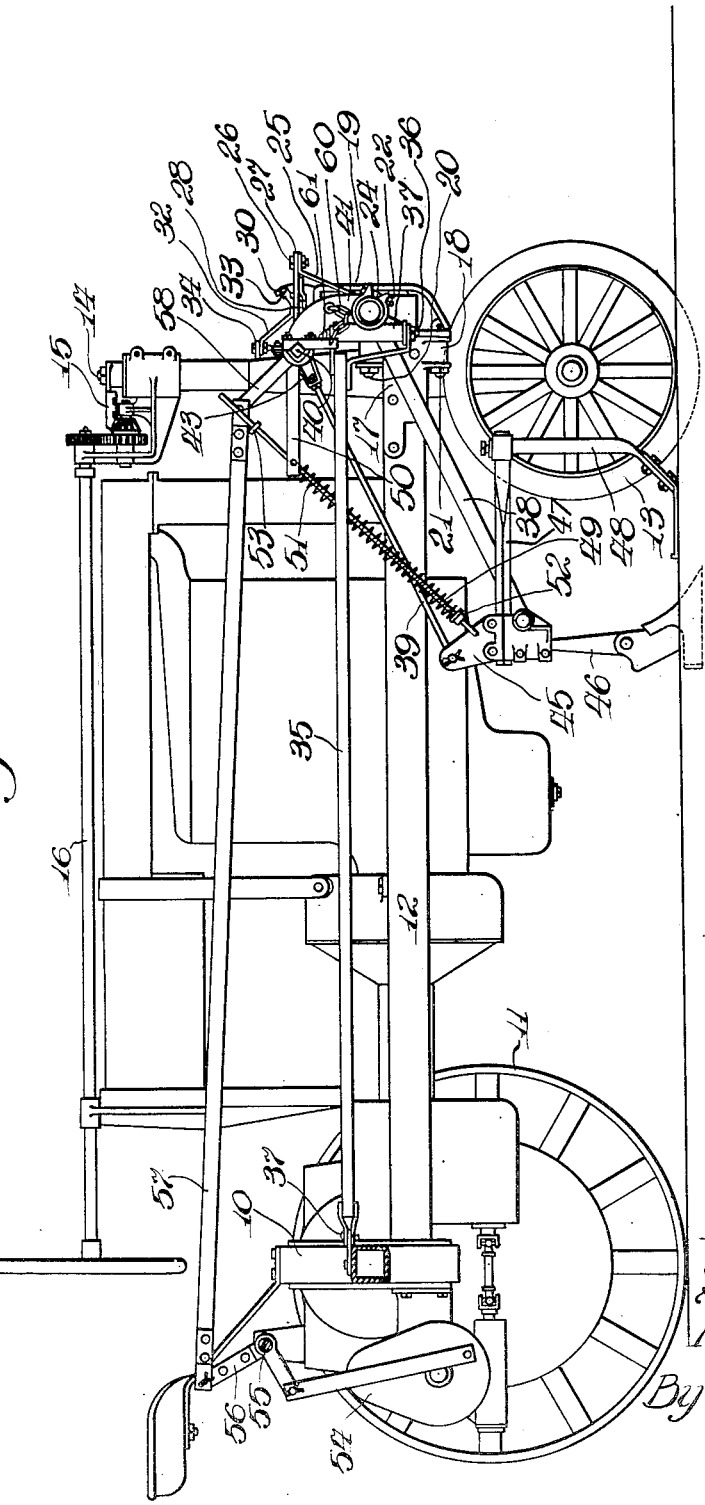

Nov. 28, 1933.    S. W. CADY ET AL    1,936,749
TRACTOR CULTIVATOR
Filed Oct. 14, 1932    3 Sheets-Sheet 3
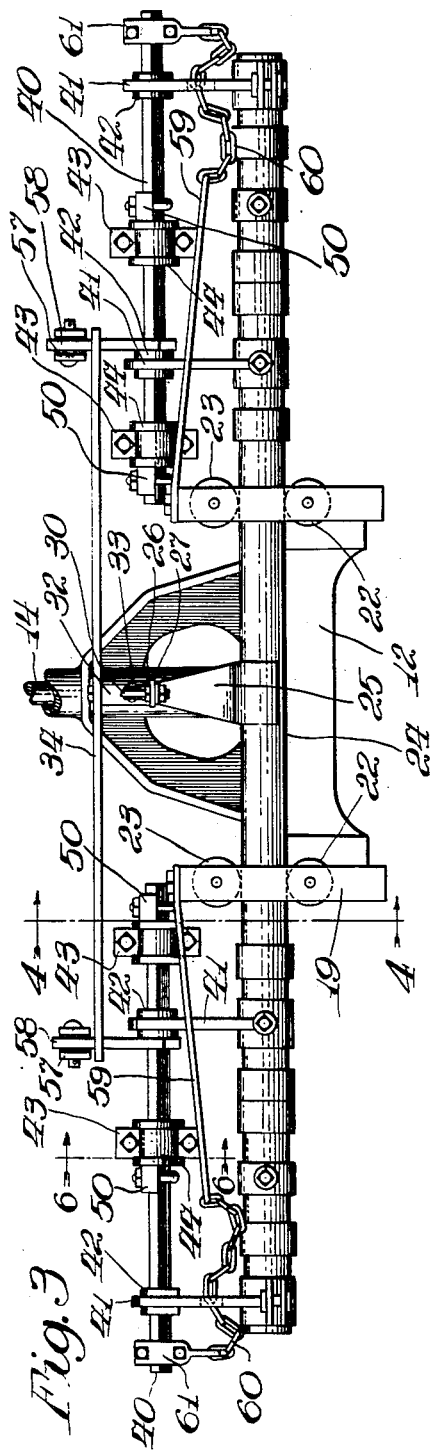
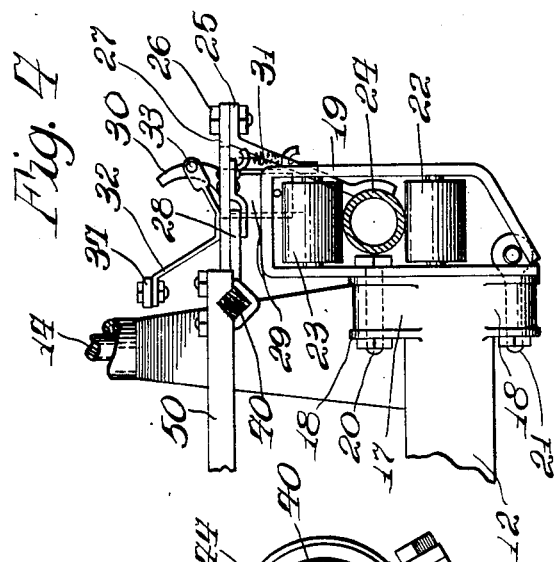
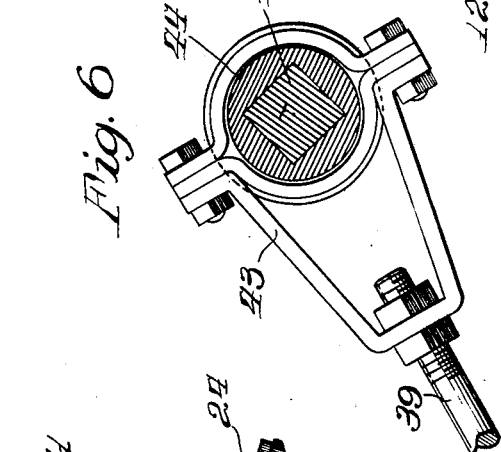
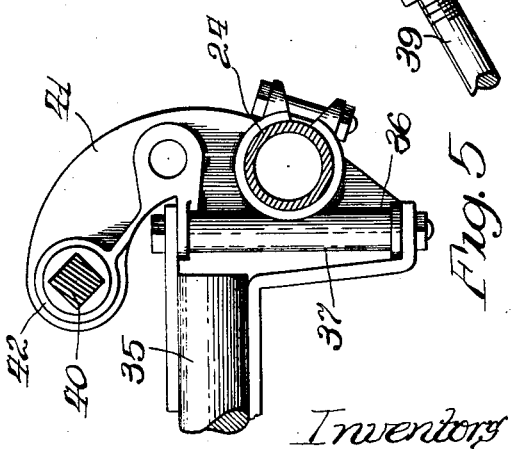
Inventors
Sherman W. Cady
Hiram P. Smith
By H. P. Doolittle Atty.

Patented Nov. 28, 1933

1,936,749

UNITED STATES PATENT OFFICE 1,936,749

TRACTOR CULTIVATOR

Sherman W. Cady and Hiram P. Smith, Canton, Ill., assignors to International Harvester Company, a corporation of New Jersey Application October 14, 1932. Serial No. 637,760

8 Claims. (Cl. 97—47)

The invention herein disclosed relates to tractor cultivators and, more particularly, to front end cultivator attachments for tractors of the row-crop type.

The principal object of the invention is to provide a light and structurally simple cultivator attachment for use in combination with row-crop tractors, which will embody novel means for supporting the cultivating tools on the tractor, so that they may be given substantially rectilinear shifting movement laterally for plant dodging purposes. Another object is to embody tool supporting and lifting means in the attachment, which will maintain the tools in level or horizontal positions during vertical movement thereof. Other objects and advantages will appear from the detailed description of the preferred embodiment of the invention hereinafter given in connection with the accompanying drawings, where:

Figure 2 is a side elevation with the rear axle of the tractor in section;

Figure 3 is a front view on an enlarged scale, showing the main or transverse member for supporting the cultivator attachment;

Figure 4 is a detail sectional view on the line 4—4 of Figure 3;

Figure 5 is a detail sectional view on the line 5—5 of Figure 1; and,

Figure 6 is a detail sectional view on the line 6—6 of Figure 3.

Figure 1:
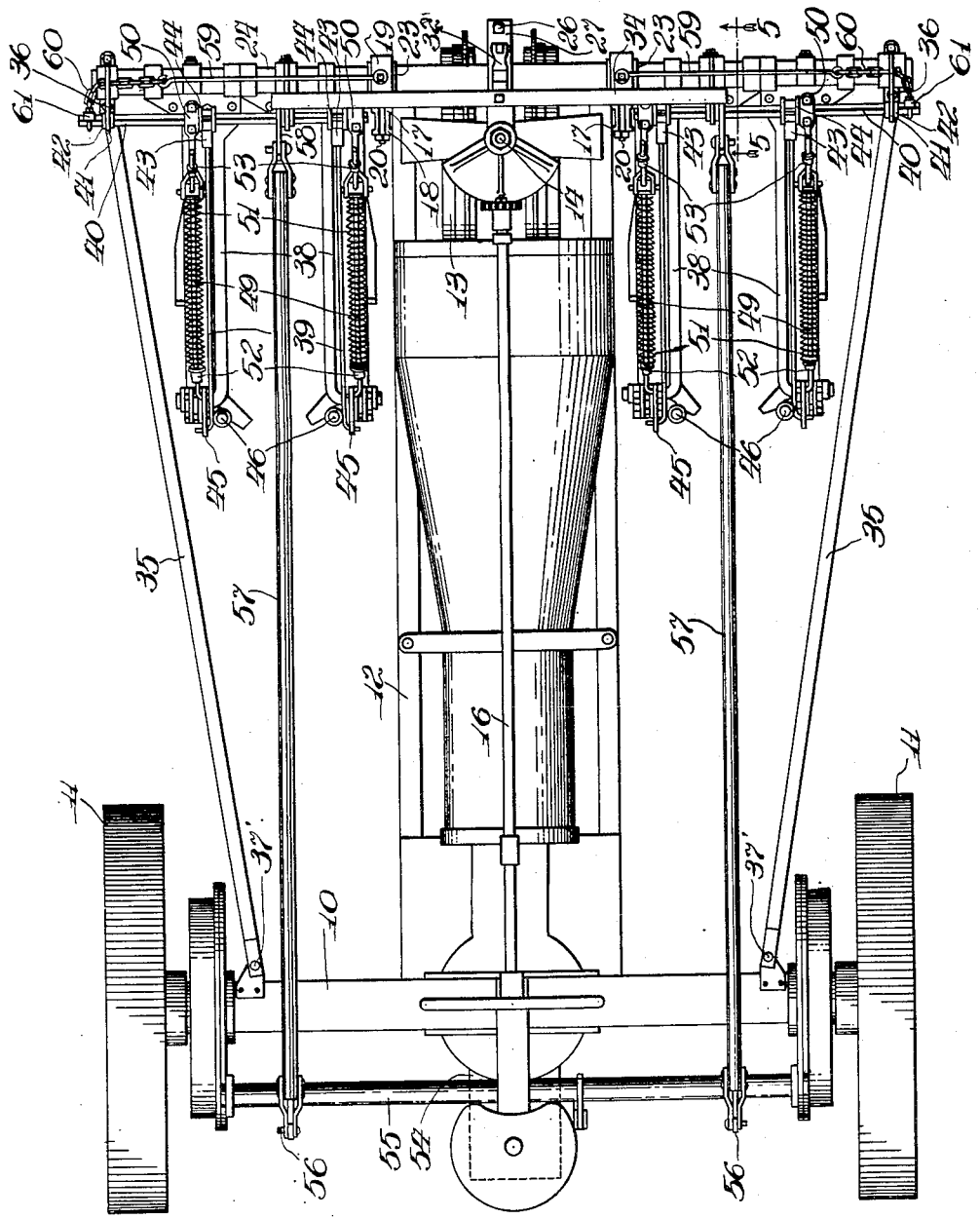
Figure 1 is a plan view of a tractor cultivator embodying the invention.

In its present embodiment, the invention is shown in combination with a row-crop tractor of the type comprising a wide tread rear axle structure 10 supported on traction wheels 11 and having a central, longitudinal body 12 supported at the front on a dirigible, narrow tread truck 13. The truck is swiveled on the forward end of the body by means of an upright standard 14 journaled in the front crosshead or casting of the body and carrying a gear sector 15 at its upper end, connected through suitable gearing with the steering shaft and wheel 16, which extends to the rear of the tractor. At each side of its front end the tractor body is provided with brackets 17 formed with vertically spaced sockets 18 for reception of the fastening means that support the bearing brackets in which the cultivating attachment to be described is carried. These bearing brackets 19 are preferably formed of a flat bar bent into oblong, rectangular shape, as best seen in Figure 4, and bolted to the brackets 17 by the upper and lower bolts 20 and 21. Each of the supporting brackets formed by the bars 19 carries vertically spaced cylindrical rollers 22 and 23. These rollers are spaced the required distance to receive between them a transversely extended member or bar 24, which is here disclosed as tubular, but may, of course, be of any shape desired. This member 24 projects beyond each side of the tractor body to overhang the plant row at each side thereof. At its center, the member 24 has welded or otherwise secured to it an upright arm 25, which is pivotally connected at its upper end, as by a bolt 26, with a forwardly extending arm 27 projecting from the standard 14 of the truck, and rotatable thereon. Immediately below the arm 27 the standard of the truck has fixed to it a shorter, forwardly extending arm 28, which terminates adjacent the rear end of a longitudinally extending slot in the arm 27. Below this slot the arm 27 is provided with a depending bracket 29 which serves as a point of pivotal support for an upwardly extending latch member 30 projecting through the slot in the arm 27. The latch member 30 is impelled rearwardly towards the end of the arm 28 by a suitable coil spring 31 and the end of the arm 28 is provided with a notch for seating the pawl when the arms 27 and 28 are parallel. The arm and latch construction and arrangement just described is substantially that shown in greater detail in the patent to Benjamin et al. No. 1,667,371 of April 24, 1928. As means for operating the latch to lock and release the arm 27 from the arm 28, there is provided a rearwardly extending arm 32, which has a runner portion resting on the arm 27 which is pivoted at its forward end, as at 33, to the upper end of the latch 30. At its rear end the arm 32 extends upwardly and carries a crossbar 34, as best seen in Figure 3, the purpose of which will be later referred to. At each side of the tractor body, the cross-member 24 is connected to a rearwardly extending thrust bar 35, which is connected to an outwardly spaced point on the cross-member 24 by means of a vertical pivot bracket 36.

The pivot bracket is formed with a vertically elongated bearing sleeve 37 which receives a pivot pin on the forward end of the thrust member 35. Each bar 35 extends rearwardly and inwardly and is pivoted at its rear end to the axle structure of the tractor by means of a vertical bearing pin, at 37'. Accordingly, thrust bars permit axial movement of the transverse member 24 between the bearing rollers 22 and 23, which are of sufficient length to permit the slight arcuate movement necessitated during the movement of the member, which is loosely seated between the bearing rollers. The member 24 is, however, held against rotation by the elongated bearing at 37.

Each of the projecting ends of the transverse member 24 supports a straddle row cultivating unit, and, as they are identical at each side of the tractor, only one of them will be described. Each straddle row unit is composed of two tool supporting rigs, and each rig consists of a lower or main dragbar 38 having its forward end journaled on the member 24 between suitable set collars thereon and an upper parallel drag link 39, which has its forward end journaled on a rockshaft 40, which is carried on the member 24. For the purpose of supporting this rockshaft, the member 24 is provided with upright, spaced arms 41 formed with bearing openings in their upper ends receiving bearing bushings 42, in which the polygonal rockshaft 40 is mounted. As best seen in Figure 6, the upper ends of the drag links 39 are connected to the rockshaft 40 through bearing brackets 43, which receive cylindrical bushings 44 on the shaft 40. The parallel dragbars 38 and 39 are connected at their rear ends by a tool bracket 45 formed with a vertical socket for reception of the shovel standard 46 and with a horizontal fore and aft socket extending therethrough for reception of the forwardly extending arm 47, on the forward end of which the standard 48 of a ground engaging gauge member is mounted. The foregoing arrangement of parallel dragbars pivotally connected by the tool bracket 45 provides a substantially rectilinear, pivotally connected linkage, which maintains the tools and the ground engaging gauge member in substantially horizontal or level position during vertical movement of the cultivating rig. In order to effect lifting and lowering of each rig and to maintain it in ground engaging position, each tool bracket 45 is provided with a lifting link 49, which is pivotally connected to the tool bracket at a point between the two dragbars 38 and 39. At its upper end the link 49 passes through a suitable collar on the free end of a radial arm 50 secured on the rockshaft 40. The usual pressure spring 51 is confined on the link 49 between the collar on the arm 50 and a stop 52 on the lower end of the link. Another stop 53 is provided at the upper end of the link 49, with which the collar on the arm 50 will contact when the rockshaft 40 is swung to move the arm 50 upwardly and forwardly, thereby lifting the cultivator rigs from the ground. This swinging of the rockshaft is preferably effected by means of power lift mechanism on the rear end of the tractor, as at 54, which actuates crank and link mechanism to swing a rockshaft 55 carrying bell crank levers 56, to which forwardly extending lift actuating bars 57 are connected at their rear ends. These bars are pivotally connected at their front ends to crank arms 58 on the rockshaft 40, whereby this shaft will be oscillated in opposite directions alternately on each half revolution of the power lift mechanism. In order to prevent excessive axial movement of the transverse member 24, the roller carrying brackets at each side of the tractor may be provided with laterally extending rods 59 connected by flexible elements, such as chains 60, to a suitable clamp 61 on each of the rockshafts 40, as best seen in Figure 3. The crossbar 34 carried by the arm 32, which in turn is connected to the latch member 30, has its ends located within the arc of movement of the crank arms 58 on the rockshafts 40. Accordingly, when the rockshaft is swung forwardly to lift the cultivator rigs, the arms 58 will strike the ends of the bar 34 and cause the latch member 30 to be swung forwardly out of engagement with the notch in the arm 28, thereby releasing the arm 27 and with it the transverse member 24 from the connection with the standard 14, as is desirable for transport purposes.

In operation, the member 24 carrying the straddle-row cultivator units is connected to the standard of the steering truck through the arms 25, 27 and 28 and the interposed latch, and steering movements of the truck will cause axial shifting of the member to impart plant dodging movements to the cultivator units.

The foregoing construction, is, therefore, one in which comparatively few parts are employed and in which there is afforded a directly connected type of cultivator attachment having rectilinear shifting movement as well as parallel lift mechanism, all carried on one main supporting member, the bar 24.

The preferred embodiment of the invention above described may be subject to variations in details of construction without departure from the scope of the invention as defined in the following claims.

What is claimed is:

1. The combination of a tractor, fixed supporting means extending forwardly on the front end of the tractor, a transversely extending member loosely carried on said supporting means for translative movement horizontally with respect thereto and projecting beyond each side of the tractor, means on the tractor for shifting said member axially, a thrust member connected to each projecting portion of the transverse member by a vertical pivot and similarly connected to the rear portion of the tractor, and tillage tools having drag bars trailing from the projecting portions of the transverse member.

2. The combination of claim 1, the vertical pivot between each thrust member and the transverse member being mounted in elongated bearings to prevent rotation of the transverse member.

3. The combination of a tractor, bearing brackets mounted on the forward portion of the tractor in laterally spaced relation, a transversely extending member loosely mounted in the brackets for movement axially and projecting beyond each side of the tractor, means on the tractor for shifting said member axially, a thrust member connected to each projecting portion of the transverse member by a vertical pivot and similarly connected to the rear portion of the tractor, tillage tools having dragbars pivotally supported on the projecting portions of the transverse member for movement vertically, and means carried by said portions of the transverse member for lifting and lowering the dragbars.

4. The combination of a tractor, fixed supporting brackets mounted on the forward end thereof, a pair of bearing rollers mounted in each bracket in vertically spaced relation, a transversely extending member positioned between the bearing rollers and supported thereby for free movement axially, means on the tractor for shifting the transverse member axially, vertically movable tillage tools mounted on the transverse member, and means on the transverse member for moving the tools vertically including a rockshaft carried by the transverse member.

5. The combination of a tractor, bearing brackets mounted on the forward portion of the tractor in laterally spaced relation, rollers mounted in said brackets, a transversely extending member mounted in bearings on the brackets for movement axially and projecting beyond the tractor body, means on the tractor for shifting said member axially, upright standards secured to the transverse member in laterally spaced relation, a rockshaft journaled in bearings on said standards, means on the tractor for rocking said shaft, a radial arm thereon, vertically spaced parallel dragbars pivoted to the transverse member and rockshaft respectively for movement vertically and trailing rearwardly therefrom, a tool bracket pivotally connecting the free ends of said dragbars, a lifting link connecting said bracket to the radial arm on the rockshaft, and soil working means secured to the bracket.

6. The combination of a tractor, a transverse member mounted on the forward portion of the tractor and projecting laterally therefrom, upright standards secured to said transverse member, a rockshaft journaled in bearings on said standards, means on the tractor for rocking said shaft, radial arms thereon, vertically spaced parallel dragbars pivoted to the transverse member and rockshaft respectively for movement vertically, a tool bracket pivotally connecting the free ends of said dragbars, a lifting link connecting the bracket to the radial arm on the rockshaft, and soil working means secured to the bracket.

7. The combination of a tractor, a transverse member mounted on the tractor, a shaft mounted on said member above and parallel thereto, vertically spaced parallel dragbars having their forward ends pivoted on the transverse member and shaft respectively for movement vertically, a tool bracket pivotally connecting the free ends of said dragbars including a rigid horizontal arm extending forwardly from said bracket, and a ground engaging gauge element supporting the forward end of said arm.

8. The combination of a tractor, a transverse member mounted on the tractor, a shaft mounted on said member above and parallel thereto, vertically spaced parallel dragbars having their forward ends pivoted on the transverse member and shaft respectively for movement vertically, a tool bracket pivotally connecting the free ends of said dragbars having a horizontal fore and aft socket extending therethrough, a horizontal bar seated in said socket and extending forwardly of the bracket, and a ground engaging gauge element on the forward end of said bar.

SHERMAN W. CADY.
HIRAM P. SMITH.